UNITED STATES PATENT OFFICE.

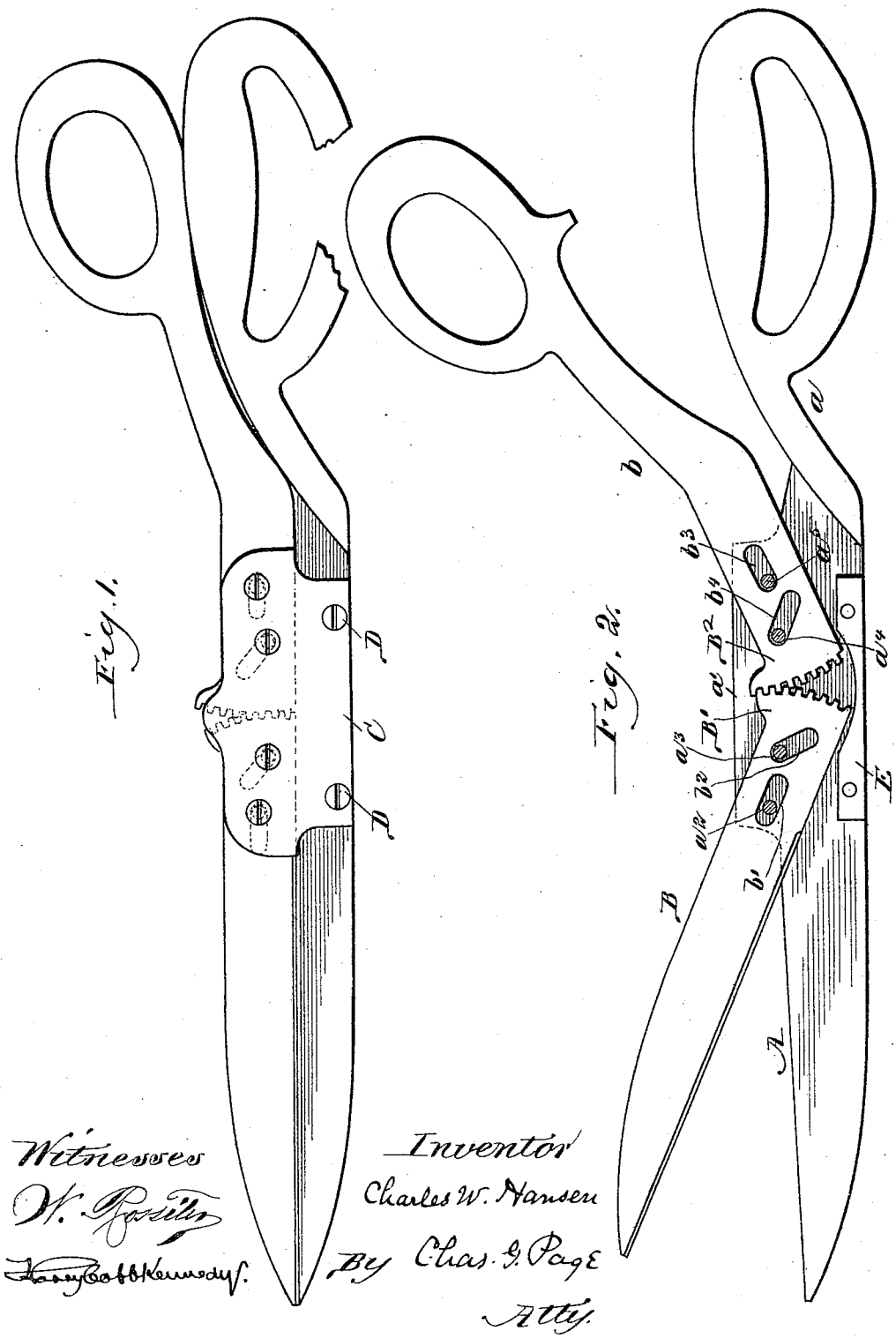

CHARLES W. HANSEN, OF CHICAGO, ILLINOIS.

SHEARS.

SPECIFICATION forming part of Letters Patent No. 460,705, dated October 6, 1891.

Application filed December 2, 1890. Serial No. 373,318. (No model.)

*To all whom it may concern:*

Be it known that I, CHARLES W. HANSEN, a citizen of the United States, residing at Chicago, in the county of Cook and State of Illinois, have invented a certain new and useful Improvement in Shears, of which the following is a specification.

My invention relates to cutting implements known as "shears," and involving a pair of blades provided with handles and pivotally held together between their cutting and handle portions, it being understood that the term "shears" as herein used also comprehends scissors, which, in fact, are simply small shears.

In my application for Letters Patent of the United States filed on or about November 24, 1890, and serially numbered 372,543, I have described two constructions of shears for effecting a draw cut and claimed a construction involving a principle embodied in both. In my present application I desire to specifically cover one of the constructions described in my said former application.

In the accompanying drawings, Figure 1 represents the shears embodying my invention in a closed condition and illustrated in dotted lines the guideways and a gear connection between one of the blades and its handle portion. Fig. 2 represents the shears in an open condition, with the cover-plate removed for convenience of illustration.

The blade A is rigid with its handle portion $a$, while, on the other hand, the blade B is made separate from its handle $b$, but gear-connected therewith, so that by opening and closing said handle relatively to the handle of blade A the blade B can be opened and closed with reference to said blade A.

The blade B and its separated handle portion $b$ are both pivotally held upon the shank portion $a'$ of the blade A and arranged so that when the blade B is operated it will have in conjunction with its swinging action an end or draw movement. In order to attain this compound action on the part of blade B it is provided at its inner end with a gear-segment B', which engages with a similar gear-segment B² on the handle portion $b$, and said blade and handle portion are each provided with a pair of slots or like guideways for pivots which are carried by the blade A in each of the two pairs of guideways respectively alloted to said members B and $b$ of the shears. One is diagonal to and the other in line with the length of the member to which they are allotted. Thus the blade B has its inner end or shank portion provided with guideways $b'$ and $b^2$, respectively, coincident with and oblique to its length, and in like manner the inner end portion of handle $b$ is provided with guideways $b^3$ and $b^4$, respectively, coincident with and oblique to its length. The guideways of the blade B receive pivots $a^2$ and $a^3$, which are carried by the blade A, which said blade is also provided with pivots $a^4$ and $a^5$, arranged to engage in the guideways of the handle portion $b$.

By reason of the aforesaid guideways and pivots engaging therein each of said members B and $b$ will have a like end movement during such swinging action as it may have in operating the shears. This synchronous end motion on the part of blade B and its handle portion serves to keep their toothed portions B' and B² in proper mesh, and thus permit the blade B to be operated by actuating its handle $b$.

The guideways are concealed by the cheek or covering plate C, which is held by screws D, or other suitable means, upon a raised seat E on the shank portion of blade A, and preferably the pivots extend through the guideways and have their bearings in said plate at one side of the shears and the shank portion $a'$ of blade A at the opposite side of the shears.

What I claim as my invention is—

1. The combination, substantially as hereinbefore set forth, with the blade A, of the handle B, having a sliding pivotal connection therewith for the purpose described, and a separately-pivoted handle $b$, engaging blade B, as a means for operating the same.

2. The combination, substantially as hereinbefore set forth, with the blade A, of the blade B, attached thereto by a sliding pivotal connection, so as to have, when operated, the herein-described compound movement, and the handle $b$, gear-connected with the blade B and attached to blade A by a sliding pivotal connection, so that when operated it shall move in conformity with the required movement of blade B, for the purpose described.

CHARLES W. HANSEN.

Witnesses:
HARRY COBB KENNEDY,
CHAS. G. PAGE.